United States Patent [19]

De Santo et al.

[11] Patent Number: 4,860,690
[45] Date of Patent: Aug. 29, 1989

[54] MARINA DOCK AND AQUATIC LIFE HABITAT

[76] Inventors: Robert S. De Santo, 8 Sylvan Glen, East Lyme, Conn. 06333; Jeffrey H. Shapiro, Cedar Island Marina, P.O. Box 181, Clinton, Conn. 06413

[21] Appl. No.: 91,495

[22] Filed: Aug. 31, 1987

[51] Int. Cl.$^4$ .............................................. A01K 61/00
[52] U.S. Cl. ............................................ 119/3; 119/4
[58] Field of Search ................................. 119/2, 3, 4

[56] References Cited

U.S. PATENT DOCUMENTS

| Re. 24,837 | 6/1960 | Usab. | |
| 249,942 | 11/1881 | Hughes | 119/4 |
| 2,989,945 | 6/1961 | Ford. | |
| 3,187,706 | 6/1965 | Ross | 114/230 |
| 3,580,202 | 5/1972 | Thompson. | |
| 3,650,244 | 3/1972 | Fordham | 119/4 |
| 3,675,626 | 7/1972 | Down | 119/4 |
| 3,707,948 | 1/1973 | Dunathan | 119/4 |
| 3,741,159 | 6/1973 | Halaumbrenner | 119/4 |
| 3,766,888 | 10/1973 | Wiegardt, Jr. | 119/4 |
| 3,889,639 | 6/1975 | Day et al. | 119/2 |
| 3,909,971 | 10/1975 | Wilde | 119/4 X |
| 4,013,042 | 3/1977 | Ingold | 119/3 |
| 4,085,696 | 4/1978 | Shorter, Jr. | 114/266 |
| 4,170,197 | 10/1979 | Walker | 119/4 |
| 4,231,322 | 11/1980 | Gilpatric | 119/4 |
| 4,263,865 | 4/1981 | Shorter, Jr. | 114/267 |
| 4,270,488 | 6/1981 | Kennedy | 119/4 |
| 4,317,429 | 3/1982 | Leighton et al. | 119/2 |
| 4,395,970 | 8/1983 | Kunkle et al. | 119/4 |
| 4,418,634 | 12/1983 | Gerbus | 114/163 |
| 4,621,588 | 11/1986 | Harris | 119/4 |

FOREIGN PATENT DOCUMENTS

| 8503411 | 8/1985 | PCT Int'l Appl. | 119/3 |
| 8605946 | 10/1986 | PCT Int'l Appl. | 119/3 |

Primary Examiner—Robert P. Swiatek
Attorney, Agent, or Firm—Chilton, Alix & Van Kirk

[57] ABSTRACT

A dock includes a frame and a deck covering the frame, and an aquaculture habitat below the deck including at least one tray supported within the frame below the deck, such that the trays are suspended in the water.

11 Claims, 1 Drawing Sheet

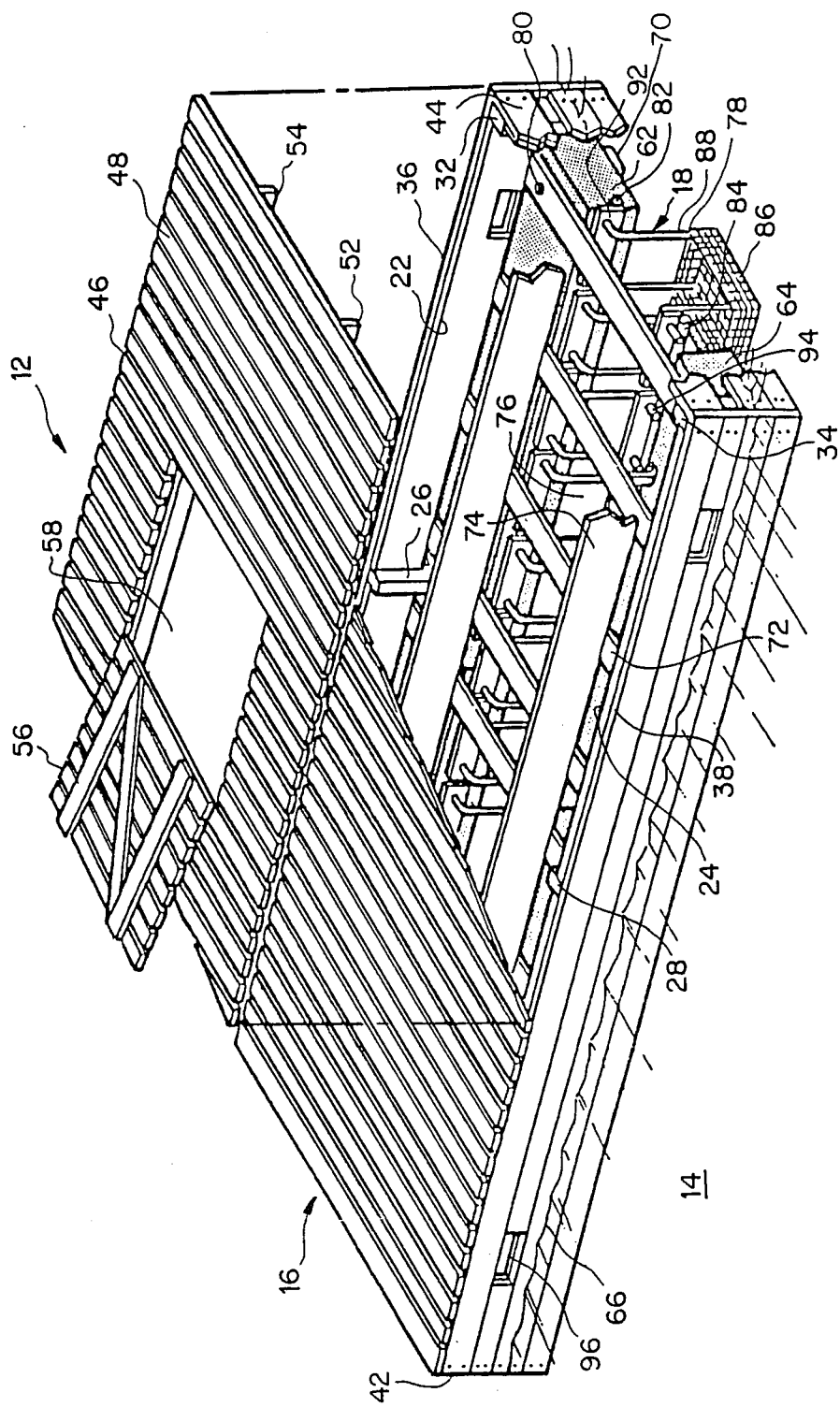

MARINA DOCK AND AQUATIC LIFE HABITAT

BACKGROUND OF THE INVENTION

The present invention relates to marina dock structures, and more particularly to such structures for use on shorelines where special care is needed to preserve the natural ecological balance.

In many areas of the country, the growth in recreational use of the shoreline, particularly for marinas, appears to conflict with efforts to preserve the natural ecological balance of the shoreline and wetlands. Of particular concern is the effect of marina dock structures and associated boat traffic, on the breeding and growth patterns of clams, oysters, shrimp, scallops, lobsters, crabs, and other valuable aquatic life.

The conflict between recreational and commercial development, and the preservation of the natural ecology, has usually been a zero-sum conflict, in which gains made by proponents of one side were made at the expense of losses for proponents of the other side. This situation has resulted in prolonged and acrimonious administrative processes and ill will between the various participants in the planning, development, and use of marinas.

SUMMARY OF THE INVENTION

It is thus an object of the present invention to provide a marina dock which is ecologically compatible with the shoreline, wetlands, flats, and other natural habitats of the coastal zone.

It is a more particular object of the invention that the marina dock compensate for the detrimental effect of a conventional dock with respect to the breeding and growth patterns of shrimp, scallops, clams, oysters, crabs, and similar aquatic life.

According to the present invention, a marina dock is modified to incorporate a aquatic life habitat such that the combination provides the marina with a conventional dock for mooring boats and the like, and the aquatic life habitat remains unobtrusively contained under the dock yet is accessible for the seeding, maintenance, and harvesting associated with conventional aquaculture activities.

In one general form, the invention includes a dock having a pair of opposed side walls partly immersed in a body of water, and a deck spanning the side walls above the water. A track or similar mounting structure is supported within the walls and under the deck. A plurality of aquaculture trays are suspended from the mounting structure into the water below the deck, where aquatic life can be cultivated. Preferably, the deck includes a hatch through which the trays can be inserted, removed, or maintained.

BRIEF DESCRIPTION OF THE DRAWING

The preferred embodiment of the invention will be described with reference to the accompanying drawing, which is a perspective view of a marina dock incorporating a life habitat, a portion of the deck being depicted above its normal position to reveal the aquaculture trays and tray supporting structures situated below the deck.

DESCRIPTION OF THE PREFERRED EMBODIMENT

The drawing shows a marina dock and aquatic life habitat apparatus 12 in perspective, floating in a body of water 14. The apparatus comprises two main structures, a dock 16 and an aquaculture habitat 18. In its most general form, the invention is directed to the combination of the aquaculture habitat and the marina dock, with each of these major structures capable of performing its normal function independently of the other, yet together providing a synergistic benefit to the community in which the apparatus is situated.

In the illustrated embodiment, the dock 16 includes a rectangular frame having a length dimension oriented from left to right in the drawing, which may be on the order of ten feet or more, and a width dimension on the order of five feet or more. The frame has a depth of, typically, about 18 inches and is designed for a water line at about mid height on the frame. Preferably, the frame includes opposed inner walls 22, 24 which are rigidly attached to respective vertically oriented studs 26, 28 and corner braces 32, 34. Each inner wall 22, 24 and stud 26 has attached thereto, an outer wall or siding 36, 38, typically comprising boards extending longitudinally and nailed, bolted, and glued to the inner walls at the stud and corner locations. Preferably the top edges of the inner walls 22, 24 are flush with the top edges of the outer walls 36, 38, but the outer walls have a greater vertical dimension, e.g., twice the height of inner walls 22, 24. Preferably, the frame also includes opposed transverse walls 42, 44 which are constructed and supported in a manner similar to the longitudinal walls.

A flat deck 46 spans the top edges of the longitudinal walls 36, 38, preferably over the full longitudinal extent of these walls, i.e., from one transverse wall 42 to the other transverse wall 44. The deck 46 typically comprises a plurality of parallel planks 48 nailed and/or screwed to the upper edges of the longitudinal walls 36, 38. The deck 46 could be prefabricated by nailing the planks 48 to a pair of sub-joists 52, 54 running perpendicularly on the underside thereof. For reasons to be explained more fully below, the deck preferably includes a hinged hatch 56 or the like, located approximately in the center of the deck, which provides a passageway 58 for access to the area below the deck.

The dock 16 may be anchored, connected to another dock, or otherwise supported in a stationary position in the body of water 14. Two spaced apart buoyancy or flotation pads 62, 64 are located within the frame below the deck 46, adjacent the longitudinal walls 36, 38. The flotation pads 62, 64 are preferably supported directly or indirectly by the frame, so that the pads determine the buoyancy of the apparatus and thus the elevation of the water line 66 along the height dimension of the walls.

The flotation pads 62, 64 are preferably made of Cellulite or plastic material which may be drilled and used to support or attach to other structures. In the illustrated embodiment, the lateral extremities of the pads fit under the lower edges of the inner walls 22, 24. A plurality of cross members or beams 72 are spaced transversely to the longitudinal walls 36, 38 and captured at their ends between the inner walls 22, 24 and the flotation pads 62, 64. At least one board 70 spans the longitudinal underside of each pad 62, 64 and is supported at the transverse or end walls 42, 44. The cross members 72 provide a support surface for the main joists 74 which extend below the deck parallel to the longitudinal walls, and which provide vertical support to the deck. Also, the pads 62, 64 are attached to the boards 70 and at least one cross member 72, by a bolt 80 or the like.

In accordance with the preferred embodiment of the invention, the longitudinal space 76 between the flotation pads 62, 64 is utilized to accommodate a plurality of aquaculture baskets 78, which are suspended in position under water above the bottom. Preferably, a track structure, such as support bars 82, 84 is attached to the end walls 42, 44 and traverses the opposed faces of the flotation pads 62, 64, along their full longitudinal extent. A plurality of basket structures 78 are suspended from the support bars 82, 84 and are longitudinally slidable thereon. Each basket structure 78 includes one or more stacked plastic trays 86 to which are connected a plurality, preferably four, vertically extending arms, situated in pairs. Each pair of arms 88 has a bracket 92 connected at the ends of the arms opposite the trays, and the bracket has laterally extending fingers 94 resting on one of the support bars 92 or 94.

For the dock having the dimensions mentioned above, up to twelve baskets 78, each having one or more trays 86, can be deployed within the frame. In the illustrated embodiment, in which four walls substantially enclose the habitat 18, access is provided through the hatch 56. The hatch passageway 58 is large enough for an individual basket structure 78 to be lowered or removed from the habitat. In the illustrated embodiment, the habitat operator can position himself along side the hatch and, with a pole or the like, slide the individual baskets 78 longitudinally along the bars 82, 84 until the selected basket is under the passageway. Alternatively, a rope can be tied to the baskets farthest from the hatch such that the farthest and any intermediately positioned baskets can be drawn toward the hatch.

A plurality of ports 96 can be provided at a height on the side walls near the water line 66, to provide entryways for ducks or other aquatic birds to enter the frame and build nests on the flotation pads 62, 64.

It should be understood that the details of the dock and habitat structures described above represent the preferred embodiment of the invention, but that other arrangements of equivalent function could likewise be constructed without departing from the scope of the invention as defined in the appended claims. Fundamentally, the present invention includes variations of a dock and aquatic habitat combination, in which the dock functions in a normal manner, to provide a surface on the water for fishing, swimming, boat mooring, and other human activity unrelated to marine life cultivation, and the habitat is supported by the dock beneath the deck, for aquaculture purposes independent of such normal dock activities. For example, it is not absolutely necessary that the frame include sidewall structure of the type illustrated. Such sidewalls are desirable where ice damage could be a problem or where armor for the flotation pads is needed.

The present invention is particularly well suited for supporting oyster populations in a marina. Oyster larvae attach to the intertidal and subtidal pilings, bulkheads, docks and finger piers. They do not survive being buried is soft marina sediments. Therefore, the marina habitat for oysters can be significantly enhanced by increasing the presence of suitable hard and submerged surfaces relative to conventional docks. With the present invention, the surface area suitable for enhancing the population of oysters can be multiplied several times relative to the area available with conventional docks having the same deck area or perimeter.

Furthermore, the incorporation of the habitat structure into the dock, in accordance with the invention, can be made without a significant cost increase relative to providing a conventional dock of comparable dimensions.

What is claimed is:

1. A marina dock and aquatic life habitat apparatus comprising:
    a dock providing secure moorings for a plurality of boats, the dock including a pair of opposed walls and a deck spanning the tops of the walls;
    first means, associated with the dock, for maintaining the dock in a stationary position in a body of water with the water line below the deck and along said walls;
    a plurality of aquaculture trays associated with the dock; second means, supported from within the walls below the deck, for defining a track; and
    third means slidably supported by the track, for suspending the aquaculture trays into the water below the deck.

2. The dock habitat apparatus of claim 1, wherein said first means includes buoyancy means supported by the walls under the deck, for floating the dock.

3. The marina dock and habitat apparatus of claim 2, wherein said buoyancy means include two spaced apart pads and wherein said second means is situated in the space between said pads.

4. The marina and habitat apparatus of claim 3, further including cross members resting on said flotation pads perpendicular thereto, and joist members resting on the cross members for supporting said deck.

5. The marina dock and habitat apparatus of claim 4, wherein, said second means includes a pair of spaced apart support bars attached to the dock extending into the space between the pads, and
    said third means includes a bracket resting on each bar and slidable thereon in a direction parallel to said walls.

6. The marina dock and habitat apparatus of claim 5, wherein said third means further includes at least one arm extending downward from each bracket, and at least one tray connected to each arm for suspension in the water.

7. The marina and habitat apparatus of claim 1, wherein,
    said second means includes a pair of spaced apart support bars extending in parallel with the walls; and
    said third means includes a pair of opposed brackets resting on the respective support bars and slidable thereon, for suspending at least one tray into the water.

8. The marina dock and habitat apparatus of claim 1, wherein,
    said pair of opposed walls defines a dock length dimension,
    said apparatus further includes a second pair of spaced apart walls defining a dock width dimension, and
    said second means extends in the longitudinal direction and is supported by the second pair of walls.

9. The marina dock and habitat apparatus of claim 1, wherein said dock includes hatch means for selectively exposing the trays to access through the dock.

10. The marina dock and habitat apparatus of claim 1, wherein said opposed walls include at least one port substantially at the water line.

11. The marina dock and habitat apparatus of claim 1, wherein each of said trays has a plurality of arms extending upwardly therefrom to an elevation adjacent the track, and wherein said third means further includes bracket means connected to the arms for sliding movement along the track.

* * * * *